April 2, 1968  J. E. VISSER ET AL  3,375,575
HEAT AND PRESSURE GLASS BONDING OF SPACED MAGNETIC
HEAD PORTIONS BY FORMING AND USING
GLASS OVER FLOW CHANNELS
Filed May 6, 1963

INVENTORS
JAN ERIK VISSER
MATTHIJS H.M. VROLIJKS
BY
Frank R. Trifari
AGENT 3,375,575
HEAT AND PRESSURE GLASS BONDING OF SPACED MAGNETIC HEAD PORTIONS BY FORMING AND USING GLASS OVER FLOW CHANNELS
Jan Erik Visser and Matthijs Henricus Maria Vrolijks, Emmasingel, Eindhoven, Netherlands, assignors to North American Philips Company, Inc., New York, N.Y., a corporation of Delaware
Filed May 6, 1963, Ser. No. 278,012
Claims priority, application Netherlands, May 4, 1962, 278,093
1 Claim. (Cl. 29—603)

This invention is concerned with magnetic heads having bonding glass gap spacers and with methods of manufacturing such heads.

This type of magnetic head, in which sintered oxidic ferromagnetic material (ferrite) is used as the magnetic material, is especially useful when heads having very short gap lengths are desired. One method of manufacturing these heads is shown, for example, in United States Patent 3,024,318, assigned to the assignee of the instant application. The method described in this patent consists of interposing a glass foil between the polished ferrite gap surfaces, the thickness of the foil exceeding slightly the ultimately desired gap length, heating the assembly thus formed to a temperature lying in the softening range of the glass and compressing the assembly at a temperature lying in the softening range under a pressure such that, after hardening of the glass, the correct gap length is achieved.

A problem sometimes encountered when manufacturing magnetic heads with glass gap spacers is that air bubbles occur in the glass. This is of course undesirable since it is obvious that the bonding strength is thereby reduced and, in addition, the ferrite gap edges may be insufficiently supported, with the consequence that the gap edges tend to crumble away.

The primary object of the invention is to provide a method for manufacturing magnetic heads having bonding glass gap spacers in which the glass is more homogeneous and does not contain air bubbles.

Another object of the invention is to provide a relatively simple and easily performed method of manufacturing heads of the above type which yields heads having good mechanical and magnetic properties.

The above and further objects of the invention, together with the various features thereof, will be best understood from a consideration of the description below, taken in conjunction with the accompanying drawing, wherein.

Figure 1:
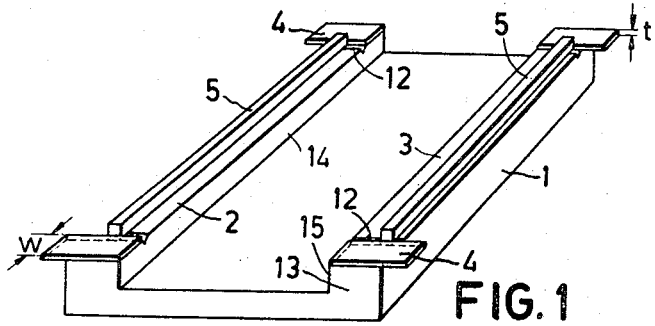
FIG. 1 shows one magnetic circuit part of sintered oxidic ferromagnetic material (ferrite)
Figure 2:
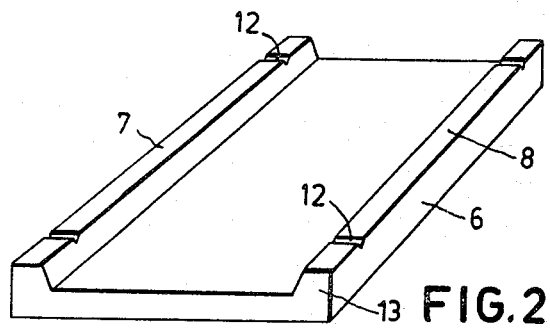
FIG. 2 shows a second circuit part of the same material adapted to co-act with the part of FIG. 1.

Referring now to the drawing, wherein like reference numerals denote like parts, reference numeral 1 denotes generally a magnetic circuit part composed of a sintered oxidic ferromagnetic material. The circuit part 1 is shown in the figures as U-shaped but the invention is not restricted thereto and any convenient shape may be chosen. Circuit part 1 has end faces 13 and upstanding legs 14 and 15. The legs 14 and 15 are provided with gap surfaces 2 and 3 which, in the assembled head, co-act with similar surfaces on a second magnetic circuit part, shown generally as reference numeral 6 in the figures.

The surfaces 2 and 3 should be ground flat and polished; spacing members 4, having a thickness $t$ equal to the desired gap length are placed on the surfaces 2 and 3, at the ends thereof, preferably flush with the end surfaces 13, as shown in FIG. 1. The spacing members may be made, for example, of beryllium copper, mica or any other suitable non-magnetic material. The width $w$ of each spacing member is not critical and may be given any convenient value approximating the relative proportions shown in the figure. Glass rods 5 are then placed on the surfaces 2 and 3 as shown, each rod being located between the spacers 4 also located on the particular surface. While the glass rods are shown as rectangular in FIG. 1, they may be of any other convenient shape as long as the smallest cross-section of the rod is greater than the thickness $t$ of the spacing member, i.e., the body portions of the rods should extend up beyond the top faces of the spacers.

Figure 3:
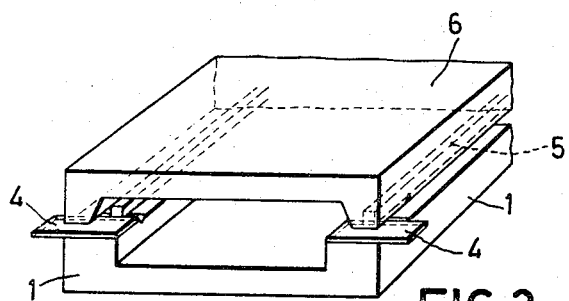
FIG. 3 shows the parts of FIGS. 1 and 2 placed in co-acting relationship with each other, before heating.

After the spacers 4 and the glass rods 5 are in place on the surfaces 2 and 3, a second circuit part 6, also composed of a sintered ferromagnetic oxide material, substantially corresponding in shape with circuit part 1 and having flat and polished surfaces 7 and 8, is placed on the part 1 in a manner as shown in FIG. 3, i.e., with corresponding surfaces 2, 7 and 3, 8 facing each other separated by glass rods 5. As can be seen, the surfaces 7 and 8 rest on the glass rods.

Prior to placing the two circuit parts adjacent to each other as in FIG. 3, small cross grooves 12 may be sawed in the polished surfaces 7 and 8. Also, cross grooves 12 could be sawed in surfaces 2 and 3 prior to placing spacers 4 and rods 5 thereon. If cross grooves 12 are provided, it is most advantageous if the distance from each cross groove 12 to the closest adjacent end face 13 be equal to the width $w$ of the associated spacer 5. This configuration is the one shown in the drawing. The purpose of the cross grooves is more fully set forth below.

Subsequent to the operation of FIG. 3, the assembly thus formed is heated under pressure to a temperature such that the glass melts and begins to flow. When this occurs, the circuit parts 1 and 6 move closer together, until the spacing members 4 prevent further movement. The assembly is then cooled. The gaps 9 appearing between surfaces 2, 7 and 3, 8 are thus filled with glass which bonds the two circuit parts together, each gap having a length equal to the thickness of the spacing members 4. Further, the glass has been found to be homogeneous in composition and to contain no air bubbles. This is due to the fact that, when pressure is applied, the melted glass flows outwardly from approximately the center of the gap surfaces to both edges thereof. Therefore, air or other gases which might otherwise be trapped in the glass are forced away from the glass and the bounding gap surfaces. If the volume of each glass rod is larger than the volume of the ultimately desired gap, a quantity of excess glass will be formed and this excess glass, after solidification, appears for the greater part on the inside of the gap, designated by reference numeral 10 in FIG. 4; this excess contributes to the strengthening of the bond. It has been found that it is most efficaceous if the volume of each glass rod 5 is at least 30 percent larger than the volume of the ultimately desired gap.

The grooves 12 serve to ensure that no excess glass penetrates between a spacing member and one of the surfaces 2, 3, 7 or 8. If such penetration occurred, the gap length would be longer than that desired and predetermined by the thickness $t$ of the spacing members.

Figure 4:
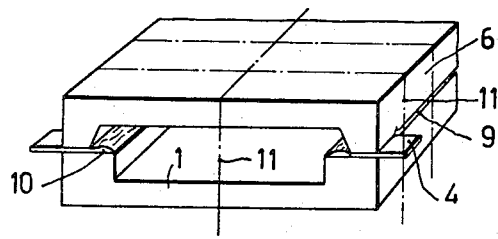
FIG. 4 shows the parts of FIG. 3 in position after heating under pressure.

The assembly shown in FIG. 4 may be divided, for example by sawing, along the axis 11, thus providing a plurality of annular magnetic head portions including gaps, to which further portions, such as a yoke and windings, may be attached, to provide a complete head. Such attachment, which may be done by conventional means, forms no part of the instant invention and is therefore not shown.

While the invention has been described with respect to a specific embodiment, various modification thereof will be apparent to those skilled in the art without departing from the inventive concept, the scope of which is set forth in the appended claims.

What we claim is:

1. A method of manufacturing parts of glass bonded magnetic heads composed of two circuit parts consisting of sintered oxidic ferromagnetic material and having gap surfaces with a gap therebetween filled with glass bonding the circuit parts together, comprising: forming first and second over-flow channel cross grooves adjacent first and second ends respectively of at least one of said circuit part gap surfaces, placing spacing members having a thickness equal to the desired gap length at opposite ends of a polished gap surface of said one circuit part, said spacing members each occupying that respective area of said gap surface between the end thereof and a respective one of said cross grooves, said gap surface having a predetermined area, placing a glass rod on said gap surface between said spacing members, said glass rod having a volume larger than the volume of the ultimately desired gap, the surface of said glass rod placed on said gap surface having an area substantially less than said predetermined area, the smallest cross-section of said glass rod being greater than the thickness of said spacing members, placing a corresponding polished gap surface of a second circuit part on said glass rod, heating the resulting assembly under pressure to melt the glass and form a gap having a length equal to the thickness of said spacing members, each of said cross grooves forming a flow channel for said molten glass to prevent said molten glass from disturbing the position of said spacing members, and cooling said assembly to allow said glass to bond the circuit parts together.

References Cited

UNITED STATES PATENTS

| | | | |
|---|---|---|---|
| 2,728,054 | 12/1955 | Albers-Schoenberg | 336—178 |
| 2,346,555 | 4/1944 | Cobb | 29—155.5 |
| 3,079,470 | 2/1963 | Camaras | 179—100.2 |
| 3,094,772 | 6/1963 | Duinker | 29—155.59 |
| 3,117,367 | 1/1964 | Duinker | 29—155.5 |
| 2,642,633 | 6/1953 | Dalton | 65—43 X |
| 2,707,694 | 5/1955 | Strandring | 156—295 X |
| 3,187,410 | 6/1965 | Duinker et al. | 29—155.5 |
| 3,258,542 | 6/1966 | Pfost | 29—155.5 X |

JOHN F. CAMPBELL, *Primary Examiner.*

J. W. BOCK, R. W. CHURCH, *Assistant Examiners.*